UNITED STATES PATENT OFFICE.

GEORGE BURT BRADSHAW AND WILLIAM HENRY BRADSHAW, OF BROOKLYN, NEW YORK; SAID GEORGE B. BRADSHAW ASSIGNOR TO SAID WILLIAM HENRY BRADSHAW.

CHICLE SUBSTITUTE AND PROCESS OF MAKING SAME.

1,134,073.      Specification of Letters Patent.      Patented Mar. 30, 1915.

No Drawing.      Application filed April 25, 1911. Serial No. 623,141.

*To all whom it may concern:*

Be it known that we, GEORGE B. BRADSHAW and WILLIAM H. BRADSHAW, citizens of the United States of America, residing in Brooklyn, in the county of Kings and State of New York, have invented certain new and useful Improvements in Chicle Substitute and Processes of Making Same, of which the following is a specification.

This invention relates to a composition of matter and the process for making the same, and with regard to its more specific features a substance having the desirable properties and features similar to chicle. Chicle, as is well known, is a plastic, rubbery substance used for a number of purposes in various arts, but is perhaps most commonly employed as a base in the manufacture of chewing gum. This substance comes from Central American countries and is generally produced by coagulating the latex of the *Sapota* tree and is more or less expensive, due to the difficulty in obtaining the same and the somewhat limited supply. It is also quite impure and dirty in its raw state, and the necessary cleaning processes through which it must pass before it can be used in the arts increases its cost.

One of the objects of the present invention is to produce a substance similar to chicle.

Another object is to provide a simple and practical process for making a substance which may be used as a substitute for chicle, or produce an article or substance that will be cheap to manufacture and entirely free from impurities, taste and poisonous matters.

Another object is to produce a substance which may be used as a base for chewing gum, the requirements therefor being considered in hereinafter describing the invention.

Other objects will be in part obvious and in part hereinafter pointed out.

The invention accordingly consists in the several steps and the relation and order of one or more of those steps with relation to each of the others thereof which will be exemplified in the hereinafter disclosed process, and the scope of the application of which will be indicated in the claims that follow.

This process is substantially as follows:—
First, resin or a combination of resins, are first purified. These resins are preferably the waste products obtained in deresinating rubbers of various kinds, such as Pontianak, amarillo, etc. As a rule the resins such as above described have objectionable tastes, and some impurities as well as poisonous principles which must be removed before the resin is in condition for use. This is best done by mechanically cleaning the resin and triturating the same with dilute soda combined with sugar, or soda alone, or even sugar alone, and subsequently blowing the same with superheated steam which decomposes and boils off some of the ingredients which contain the taste. The poisonous principles are also removed during these steps. Taking a specific case, for instance, the resin of Pontianak may be conveniently treated as follows: Pontianak resin as sold as a waste product is generally in a granular condition and contains about twenty-five per cent. of moisture and particles of dirt and rubber. The resin is first partially dried and ground through about an 8-mesh screen, when particles of rubber sieve out, and then ground in water in a pebble mill in the presence of soda and sugar. The water contains about five per cent. of sugar and about one quarter of one per cent. of soda. It is ground in the pebble mill until the liquor is in the form of a sludge containing particles from 60 to 100 mesh. The sludge from the pebble mill is diluted several times with water and then boiled and filtered, and then washed first with hot water and then with cold water. The filter cake is centrifuged and washed in a centrifugal machine and the resulting partially dried material from the centrifugal machine is further dried in trays in an ordinary drier. The drier product is then melted and blown with superheated steam until clear, or until the vapors which arise indicate that all taste has been removed from the resin. While blowing the material is kept at about 150° to 180° C. The melted blown resin is then allowed to cool slowly in order to permit sand and dirt to settle. The resin is then ready to be combined with the other ingredients, which will be taken up in order.

Second: One or several of the following varieties, of gutta, are next purified: Pontianak or gutta jelutong siak and red Niger gutta. Chemically, Pontianak is considered to be of the nature of rubber rather than gutta, although herein it will be considered as a gutta. Purification is accomplished by first cutting up, hand sorting and picking out the large pieces of dirt. The gutta is then cut into smaller bits in a machine called a hollander, which is similar to the machines used for producing paper pulp. This cutting in the hollander is done in the presence of water, preferably containing soda and zinc chlorid either together or separately, according to the condition of the raw gutta, for deodorizing and disinfecting. The soda also prevents stickiness. Part of the sand which is in the material is thus allowed to separate and sink by gravity to the bottom of the tank of the hollander and floating particles of bark arise to the surface and are skimmed off. Sometimes common salt is added to the water to change the specific gravity so as to make the gutta float, the dirt and sand sinking, thus causing a separation. In warm weather, ice is also added to the water to prevent the rubber or gutta particles from coalescing. The chopped up gutta is then placed in a tank having a cone shaped bottom, with water and salt to remove impurities by gravity. It is then washed and boiled to further remove the sand which collects in the cone. Also during this stage, some guttas are boiled in preferably not less than five per cent. sugar solution in order to remove any objectionable taste. The gutta is then taken from this boiling tank and washed on ordinary washing rolls and hung to dry, and when properly dried the various guttas are combined on the rolls in the various proportions in which they will be later used.

Third: If any rubber is used the finest plantation Ceylon pale crepe is selected. This rubber is first masticated on ordinary mixing rolls and then heated with petrolatum and worked into a solution of rubber and petrolatum. It is then ready to be used in the final compound. This rubber thus prepared can also be used as an alternative for one or more of the guttas mentioned in the second step, if desired.

Fourth: In making the combination of the resins and guttas which have been purified as described above, the proportions used depend upon the physical characteristics of the various ingredients especially their melting points. Some of the guttas has a sufficiently low melting point to soften in the mouth, but as a rule they do not soften enough to chew easily. The resins, especially after being treated to remove their taste and odor, will not soften at the temperature of the body. In order to bring these ingredients down to the proper melting point an oil or fatty substance must be added, which should be of such a character that it will not readily chew out of the mixture. It has been found that many non-saponifying oils or not easily emulsifying oils will meet this requirement. Such an oil is petrolatum, a petroleum residue, and also blown linseed and other similarly treated oils. Cocoa butter also chews out with difficulty from the mixture. If petrolatum is used as a softening ingredient it must be melted down with the resins and the mixture kept at an elevated temperature until a thorough union and solution of the resin in the petrolatum has occurred. The amount of petrolatum used depends upon the melting points of the other ingredients.

The chicle substitute as produced should be friable in order to meet the requirements of the arts. In order to obtain this friableness a certain amount of sugar is used in the compound. This sugar is added to the melted resin and petrolatum and should preferably be added hot. Also a small amount of cocoa butter can be added in order to improve the velvetiness of the chicle substitute.

In mixing the various ingredients it is found that an ordinary Werner-Pfleiderer, horizontal, jacketed, tilting mixing machine is best suited. The resins, petrolatum and cocoa butter in a melted condition in the mixing machine are allowed to come to a temperature near the boiling point of water, preferably about 210° F. and then the mixed guttas are added gradually after being first softened and warmed up by immersing in boiling water. By this means the gutta is mixed into the hot resin without chilling the resin, for if chilled there would be chunks of hard resin through the mixed product. A small amount of salt may be also added during mixing because it is found that if salt is not added the person chewing the gum would suffer discomfiture from swallowing so much mixed air and saliva and the salt seems to prevent this excessive secretion and swallowing. Before discharging from the mixing machine the batch may be allowed to cool slightly and air worked into it by revolving the paddles. This makes a more friable product. Another way is to force the finished batch through dies.

In producing a substitute for chicle best adapted to act as a base for chewing gum substantially the following materials in the proportions indicated are used,—resin 47½%; petrolatum, 8¼%; sugar, 11%; cocoa butter, 1¼%; Pontianak, 8%; siak-gutta, 5%; red Niger gutta, 19%, and salt.

It is thus seen that this invention produces a desirable composition of matter having the advantageous features of chicle by a simple, practical and inexpensive process.

As many changes could be made in carrying out the above process without departing from the scope of the invention, it is intended that all matter contained in the above description shall be interpreted as illustrative and not in a limiting sense.

We claim as our invention:—

1. A process of making a chicle substitute which consists in treating resin with a purifying agent and adding thereto gutta and a fatty substance.

2. A process of making a chicle substitute which consists in treating resin extracted from rubber gum with a sugar solution and adding thereto gutta and a fatty substance.

3. A process of making a chicle substitute which consists in treating resin extracted from rubber gum with a sugar and soda solution to purify the same and adding thereto gutta and a fatty substance.

4. A process of making chicle substitute which consists in treating resin with a purifying agent and adding thereto gutta after having been subjected to a purifying agent.

5. A process of making a chicle substitute which consists in treating resin with a purifying agent and adding thereto gutta after having been subjected to a purifying agent and deodorizing means.

6. A process of making a chicle substitute which consists in treating resin with a purifying agent and adding thereto gutta after having been subjected to a purifying agent and a solution of soda and zinc chlorid to remove the taste and odor.

7. A process of making a chicle substitute which consists in treating resin with a sugar solution to purify the same, treating gutta with a purifying agent and mixing said resin and gutta in the presence of a fatty substance.

8. A process of making a chicle substitute which consists in treating resin with a sugar solution to purify the same, treating gutta with a purifying agent and mixing said resin and gutta in the presence of a fatty substance at a temperature approximately equal to the boiling point of water.

9. A process of making a chicle substitute which consists in treating resin with a sugar solution to purify the same, treating gutta with a purifying agent and heating said resin and gutta in the presence of petrolatum.

10. A process of making a chicle substitute which consists in heating a mixture of resin and a non-saponifying oil to substantially 120° to 140° C. and adding thereto natural gum.

11. A process of making a chicle substitute which consists in heating a mixture of resin and a non-saponifying oil to substantially 120° to 140° C. and adding thereto natural gum and salt.

12. A process of making a chicle substitute which consists in purifying an ingredient of natural gum, adding a fatty substance thereto, heating the mixture to substantially 130° C. cooling the same and adding sugar and then mixing therewith purified gum.

13. A process of making a chicle substitute which consists in purifying a waste product of deresinated rubber with a sugar solution, washing, then blowing the same with superheated steam, adding a non-saponifying oil to said purified resin and heating to complete interfusion; purifying a natural gum with zinc chlorid and sugar, and adding the same to said mixture.

14. A process of making a chicle substitute which consists in purifying a waste product of deresinated rubber with a sugar solution, washing, then blowing the same with superheated steam, at approximately 165° C., adding petrolatum and cocoa butter thereto, removing the taste and odor from gutta with soda, zinc chlorid and sugar and adding the thus treated gutta to the waste product mixture while still soft.

15. A process of making a chicle substitute which consists in purifying a waste product of deresinated rubber with a sugar solution, washing, then blowing the same with superheated steam, at approximately 165° C., adding petrolatum and cocoa butter thereto, removing the taste and odor from gutta with soda, zinc chlorid and sugar, adding the thus treated gutta to the waste product mixture while still soft, adding salt to the mixture while in this condition, cooling, and forcing the finished batch through dies to make the same more friable.

16. A composition of matter the major part of which consists of extracted resin of a rubber gum, a natural gum and a fatty substance.

17. A composition of matter the major portion of which consists of the waste product of deresinated rubber, a purified natural gum and a non-saponifying oil.

18. A composition of matter the major portion of which consists of resin, gutta, and a non-saponifying oil.

19. A composition of matter the major portion of which consists of purified resin, gutta, and petrolatum.

20. A composition of matter the major portion of which consists of purified resin, purified gutta, rubber and a non-saponifying oil.

21. A composition of matter comprising the waste product of deresinated rubber, purified gutta, rubber, petrolatum, and salt.

22. A composition of matter consisting of substantially 48% of resin, 32% of gutta, 11% of sugar, 9% of a non-saponifying oil, and salt.

GEORGE BURT BRADSHAW.
WILLIAM HENRY BRADSHAW.

Witnesses:
  HAMILTON BRADSHAW,
  SAMUEL P. BRADSHAW.